Patented Aug. 15, 1933

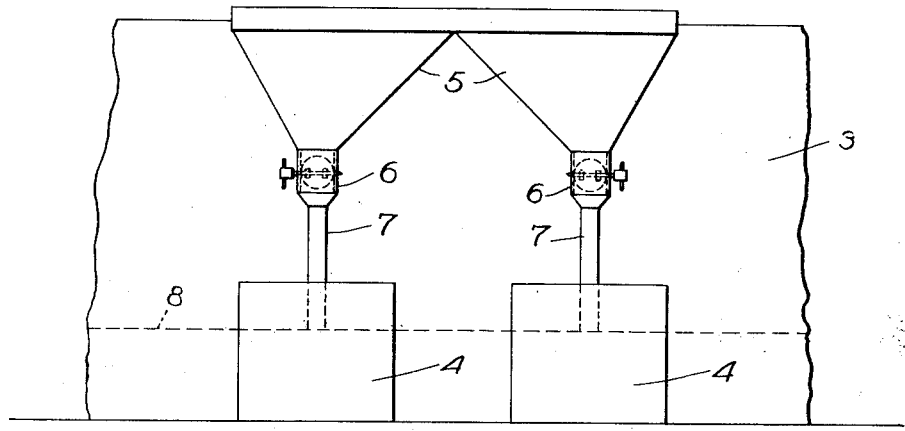
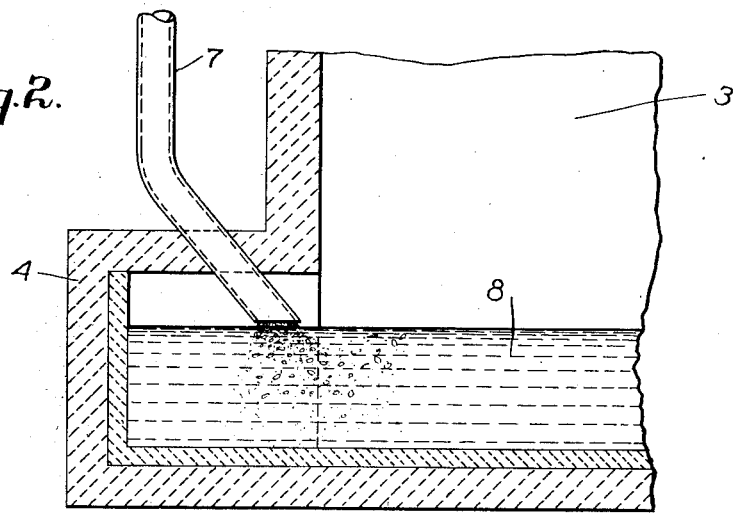

1,922,827

UNITED STATES PATENT OFFICE 1,922,827

METHOD OF AND APPARATUS FOR FEEDING MELTING FURNACES

Edward C. Stewart, Washington, Pa., assignor to Tygart Valley Glass Company, Washington, Pa., a Corporation of West Virginia Application September 24, 1931
Serial No. 564,797

6 Claims. (Cl. 49—63)

My invention relates to a method of and apparatus for feeding melting furnaces, and is hereinafter described as employed in the feeding of batch material to glass-melting furnaces, but it will be understood that the invention is capable of use in connection with other types of melting furnaces.

Heretofore it has been common practice to introduce the glass batch materials in finely divided form upon the surface of the molten glass bath at the charging end of the furnace, the batch being slowly melted and moving toward the refining end of the furnace where the molten glass is withdrawn.

This old manner of feeding the furnace is open to a number of objections. For instance, in the case of reverberatory furnaces, some of the lighter portions of the batch, in powdery form, are carried into the checker work, tending to clog the same. Again, there is a tendency toward separation or segregation of the heavier from the lighter materials in the batch. For example, the sand, soda ash and lime would tend to separate from one another, thus making for non-uniformity of composition as between the various portions of the glass bath.

Another objection to the older methods consisted in the difficulty of effecting uniformity in the rate of feed and regulation thereof with respect to the rate at which the refined glass was being withdrawn from the furnace.

One object of my invention is to provide a means and a method whereby the various objectionable features above-referred to are overcome, and whereby the batch may be introduced into the molten bath through a submerged path, with automatic control of the volume of supply, and the maintenance of a rate of supply in definite relation to the desired bath level in the tank.

One manner in which my invention may be practised is shown in the accompanying drawing, wherein Figure 1 is a fragmentary elevational view of the charging end of a furnace and of the charging apparatus, and Fig. 2 is a vertical sectional view thereof, on an enlarged scale.

The glass-melting furnace 3 may be of any of various well-known types, and is shown as provided with dog houses 4, through which charging of the batch is usually effected, but which are not essential to my method. The glass batch material is first introduced into a hopper or hoppers 5 having valve-controlled outlets 6 at their bottoms. During normal conditions of operation, the valves in these outlets will always be open, since flow of material from the hoppers or bins 5 is automatically controlled, as hereinafter explained.

Feed pipes or conduits 7 conduct the material from the outlets 6 to the molten glass bath 8 within the melting tank 3. At least the lower portions of each of the pipes 7 are inclined at about 50° to the horizontal, so that the granular material of the batch will slide or flow readily through the pipes, but at less velocity and with less force than it would through a vertical pipe.

The slope of the pipes will, of course, not be 50° in all instances since the inclination will be changed to suit conditions such as variations in character of the batch material, fluidity of the glass batch, etc. The pipes 7 could, of course, be extended directly through the rear wall of the furnace and the dog houses 4 dispensed with. Also, the number and sizes of the pipes 7 employed will depend upon the capacity of the furnace.

The lower ends of the pipes 7 terminate at the surface of the glass bath, so that the batch material is caused to sing into the molten glass instead of accumulating on the surface thereof. The weight of the column of material in the pipe 7 serves to push the discharged material below the glass level.

The discharged material will tend to rise to the surface of the glass, but in rising will be covered with a scum of molten glass, so that the material is not directly exposed to the furnace gases. This coating of the material with the viscous glass also tends to prevent segregation of the batch constitutents which are of different specific gravities. Furthermore, the batch materials, when introduced as above-described, will not be so readily carried toward the refining end of the furnace as where the materials are simply discharged upon the surface of the glass. Therefore, there will be less likelihood of insufficiently melted batch particles being drawn from the furnace with the refined glass.

Each of the pipes 7 has its discharge end located over an area of the bath that is at considerable distance from the rear end and side walls of the dog house or furnace, so that the batch material is kept out of contact with the vertical walls of the furnace, until it has become molten, and it is also kept away from the relatively stiff or partially devitrified glass in the immediate vicinity of the tank walls. This is of considerable importance, because if the batch material were deposited in proximity to a vertical wall, it would produce a congealed or semi-congealed mass in the bath at the said point, and such mass could not be properly incorporated in the bath without the application of mechanical forces, as through the use of spades, rakes, or pushing devices for moving the mass toward the middle of the tank.

As the refined glass is withdrawn from the furnace, the glass level of course tends to fall, with the result that more batch material will be permitted to flow from the pipes 7. When the glass batch is at its normal level, that is with the level of the bath substantially alined with the end of the pipe, no bath material will flow from the pipes 7, because the viscosity of the glass bath is sufficient to prevent further flow of the batch material. Therefore, the batch supply is automatically maintained.

The pipes 7 may be of metal or suitable refractory material. Although the discharge ends of the pipes are exposed to the heat of the furnace gases, I have found that iron or steel pipes will not become excessively heated, probably owing to the absorption of heat by the batch material passing through the pipes.

I claim as my invention:—

1. The method of charging a melting furnace that contains a molten bath, which comprises supplying finely divided batch material thereto through a submerged path leading from the surface of the bath to points below said surface, the path being in spaced relation to the vertical walls of the furnace.

2. The combination with a melting furnace adapted to contain a molten bath, of a charging conduit for finely divided batch material, disposed above the bath and having its discharge end disposed adjacent to the surface of the bath and in horizontally-spaced relation to the vertical walls of the furnace.

3. The combination with a melting furnace adapted to contain a molten bath, of a downwardly-extending charging conduit for finely divided batch material having its discharge end disposed adjacent to the surface of the bath in horizontally spaced relation to the vertical walls of the furnace, and inclined to such degree that the batch material will be retained therein when the bath level is at a predetermined height with respect to the said discharge end.

4. The combination with a melting furnace adapted to contain a molten bath, of a downwardly-inclined charging conduit for finely divided batch material, disposed above the bath and having its discharge end located adjacent to the surface of the bath, the said end being disposed in a plane substantially parallel to the surface of the bath, and in horizontally-spaced relation to the vertical walls of the furnace.

5. The method of charging a melting furnace that contains a molten bath, which comprises directing a substantially unbroken stream of finely divided batch material through a confined path to the surface of the bath, and upon an area that is horizontally encompassed by the molten bath.

6. The method of charging a melting furnace that contains a molten bath, which comprises directing a substantially unbroken stream of finely divided batch material through an inclined confined path to the surface of the bath, and upon an area that is horizontally encompassed by the molten bath.

EDWARD C. STEWART.